United States Patent [19]
Begley

[11] Patent Number: 5,611,287
[45] Date of Patent: Mar. 18, 1997

[54] LEVELLING DEVICE

[76] Inventor: Steven M. Begley, 1684 Dillon Rd., Maple Glen, Pa. 19002

[21] Appl. No.: 360,918

[22] Filed: Dec. 27, 1994

[51] Int. Cl.⁶ .............................. A47B 23/00; B60R 7/04
[52] U.S. Cl. ............................................. 108/44; 224/275
[58] Field of Search ........................ 108/44, 45; 248/459, 248/454; 297/256.16, 113, 250.1; 224/275, 276; 5/632; 206/491.1, 494, 495, 557

[56] References Cited

U.S. PATENT DOCUMENTS

| | | | |
|---|---|---|---|
| 2,875,940 | 3/1959 | Dunn | 206/562 |
| 3,263,900 | 8/1966 | Link et al. | 206/491.1 X |
| 3,318,456 | 5/1967 | Lipe | 108/44 |
| 3,326,446 | 6/1967 | Goings | 108/44 X |
| 3,459,328 | 8/1969 | Rowley | 206/491.1 X |
| 3,499,595 | 3/1970 | Brooks | 108/44 |
| 3,533,549 | 10/1970 | Gilchrist | 206/491.1 X |
| 4,193,150 | 3/1980 | Vineberg | 5/632 |
| 4,832,241 | 5/1989 | Radcliffe | 224/275 |
| 4,846,382 | 7/1989 | Foultner et al. | 108/45 X |
| 4,905,947 | 3/1990 | Henne et al. | 248/174 |
| 5,102,080 | 4/1992 | Altieri, Jr. | 224/275 |

*Primary Examiner*—Peter M. Cuomo
*Assistant Examiner*—James O. Hansen
*Attorney, Agent, or Firm*—Peter A. Borsari

[57] ABSTRACT

A levelling device formed from a single sheet of foldable material which is used to convert an automobile seat into a flat, horizontal surface. More particularly, the levelling device comprises front and rear straight edges, two side edges each configured in the form of stretched "Z" and at least one scored line parallel to the rear straight edge such that the scored line can be folded downward to form a support leg. In a preferred embodiment, the levelling device further comprises a locking mechanism comprising a secondary scored line, two die cuts which intersect the said primary scored line and a third die cut which is parallel to said secondary scored line, said locking mechanism being pressed downward to form a die cut finger, wherein said finger is used to keep said support leg in a secure position.

8 Claims, 7 Drawing Sheets

LEVELLING DEVICE

FIELD OF INVENTION

The present invention relates to a levelling device formed from a single sheet of foldable material which is used to convert an automobile seat into a flat, horizontal surface. More particularly, the levelling device of the present invention converts an automobile seat into a flat, horizontal surface for supporting food containers, such as pizza boxes.

BACKGROUND OF THE INVENTION

It is often necessary when transporting pizza or other "fast-foods" by automobile to place the container of pizza or other fast food onto the automobile seat. However, most car seats are designed for human comfort and are slanted rearwardly to accommodate the average person. This configuration is not exceptionally well suited for transporting food stuffs, particularly those food stuffs which have a tendency to slide about the food-carrying container, such as hot melted foods, including, for example, pizza. Rather, the standard design of automobile seats causes the foodstuffs in the container to slide towards the lowest point of the car seat, typically, the back rest. This problem is readily encountered when transporting pizza, whereupon the cheese and tomato sauce tends to "run" towards the lowest point of the car seat, and accumulate in a thick, messy glob. Moreover, with increased concerns about the earth's environment and the focus on recyclable and biodegradable materials, food containers increasingly are made of paper or cardboard, as the use of plastics, particularly styrene, has become disfavored for use in fast food containers. One inconvenience in using these paper or cardboard containers is their tendency to absorb the hot melted food ingredients. It is therefore undesirable to have such food containers come into contact with and possibly soil the automobile seat. In this day, when more families depend on take-out and hot-food home delivery in order to meet their busy schedules, there is a need for a device which provides a simple and inexpensive way of transporting pizza or other fast food in an automobile seat, while avoiding the aforementioned problems.

The prior art discloses numerous portable food and beverage containers, as well as car seat trays. However, these containers are complicated in design and construction, requiring more material to manufacture, longer time to assemble and are more expensive to produce, than the platform device of the present invention. For instance, U.S. Pat. No. 2,875,940 to Dunn discloses a portable food and beverage container or holder requiring a multitude of score lines and die cuts, including a bottom panel, a pair of side panels scoringly connected to opposite sides of the bottom panel, a top panel and a leg structure, each leg structure including a pair of panel sections scoringly connected along the length of the leg to extend normal to each other when the container is set up.

A fundamental problem associated with many of these containers, trays and the like is retaining the leg of these devices in a perpendicular position relative to the horizontal surface, such that the leg does not collapse and render the entire device useless. Both Dunn (U.S. Pat. No. 2,875,940) and Goings (U.S. Pat. No. 3,326,446) provide solutions to this problem which are both overly complicated and expensive. Dunn provides a leg 69 which has a side panel attached on each side 66. Goings provides a leg 74 which is attached by two panels, the top panel and the bottom panels. In both cases, the devices disclosed by Dunn and Goings necessitate the use of more material, are more complex and expensive to manufacture, and require alot more time to assemble than the presently claimed device. All these factors are very important in the food delivery business. Moreover, neither Dunn nor Goings allows for the length of the leg to be adjustable, which creates further problems as there are great differences in the angle and depth of automobile seats. Also, neither Dram nor Goings provide any means to allow a better fit for the platform in bucket seats.

Other attempts have been made to produce devices for transporting foodstuffs, particularly pizza. For example, U.S. Pat. No. 5,012,080 to Altieri Jr. discloses a pizza wedge support in order to provide a horizontal surface when disposed upon the inclined upper surface of an automotive seat. The wedge support is a box which requires a significant amount of material and does not allow for adjusting the angle of inclination.

As discussed above, these prior art devices have severe limitations and disadvantages associated therewith, including (a) the amount of material used, (b) the length of time it takes to assemble the device, (c) the inability to adjust the device to the varying angles and depth of various automobile seats, (d) the inability to adjust the device to varying contours of automobile seats, such as "bucket-seats", (e) the expense of the device and (f) the indisposability of the device.

Despite the teachings of the prior art, a need still exists for an uncomplicated, inexpensive, easily and quickly adjustable levelling device which will allow one to convert a car seat into a horizontal platform upon which a fast food container, such as a pizza box, can be supported. Such a device should be simple and cost effective to manufacture, should be easy to assemble and use, and should be capable of adjusting to various contours of car seats.

SUMMARY OF THE INVENTION

Accordingly, it is an object of the present invention to provide a levelling device to convert an automobile seat into a flat horizontal surface.

It is another object to provide a levelling device which may be used for supporting food containers, such as pizza boxes.

It is a further object to provide a levelling device which is of simple construction.

It is another object of the present invention to provide a levelling device comprising an adjustable support leg for conforming to the various angles and depths of the automobile seats.

It is still another object of the present invention to provide a levelling device which adjusts to the contours of the automobile seats, particularly "bucket-seats".

It is an additional object of the present invention to provide a levelling device which can quickly and easily assembled.

It is still another object of the present invention to provide a levelling device comprising one or more back-stops in order to prevent the food container from sliding.

It is still another object of the present invention to provide a levelling device which is simple and inexpensive to manufacture.

It is another object of the present invention to provide a levelling device which is disposable.

Additional objects, advantages and novel features of the invention will be set forth in part in the description and claims which follow, and in part will become apparent to those skilled in the art upon examination of the following specification or may be learned by practice of the invention.

These and other objects of the invention, as embodied and broadly described herein, are achieved by providing a levelling device for converting an automobile seat into a flat horizontal surface for supporting various foodstuff containers, including, for example, pizza boxes. The levelling device is in the form of a single sheet of foldable material, said sheet comprising (a) at least one straight edge, (b) at least one scored line parallel to said straight edge such that the portion of said sheet between said straight edge and said scored line can be folded downward to form a support leg, and (c) a locking mechanism which can be folded downwardly to form a finger in such a manner that the leg supports the platform.

DETAILED DESCRIPTION

The present invention relates to a levelling device formed from a single sheet of foldable material which is used to convert an automobile seat into a flat horizontal surface. The foldable material is preferably constructed of corrugated cardboard. However, other types of cardboard or heavy paper may also be substituted. Accordingly, it is to be understood that any foldable material, capable of supporting a food container, is suitable for use in producing the levelling device of the present invention, as will be readily recognized by practitioners in the art.

Figure 1A:
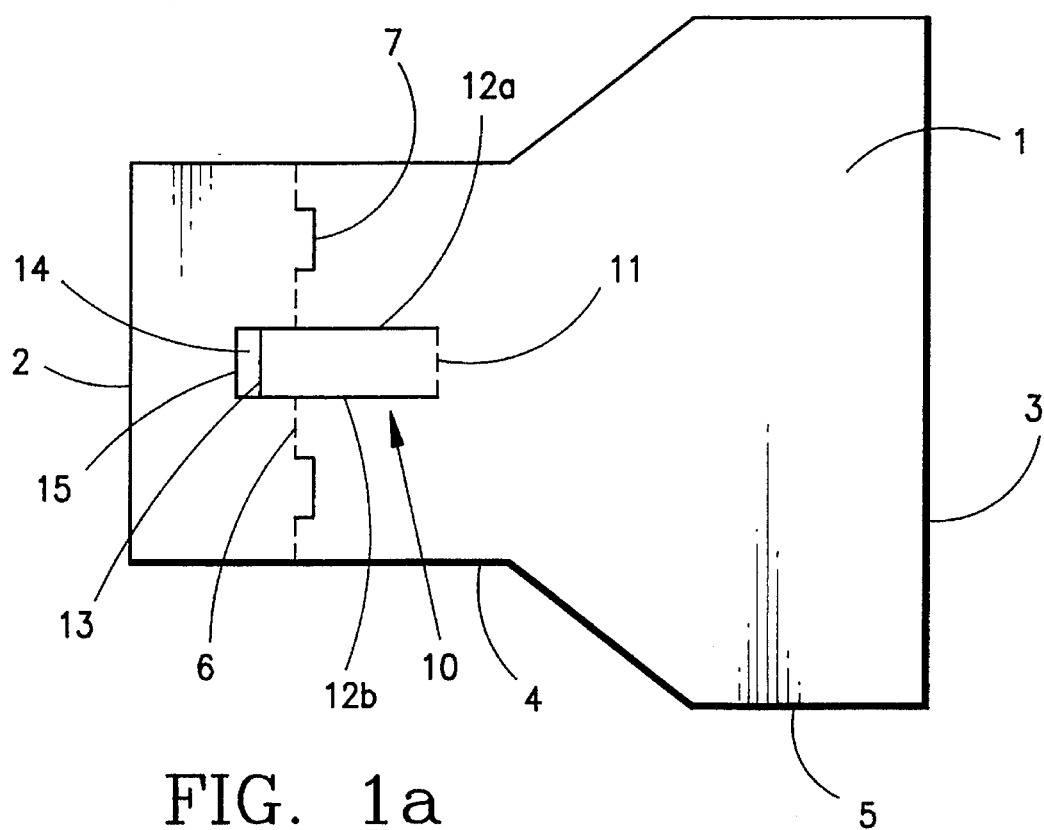
FIG. 1a shows a top view of the levelling device of the present invention.

As shown in FIG. 1a, the levelling device, sometimes hereinafter referred to as the platform device or simply the platform, comprises a single sheet of foldable material 1. Sheet 1 comprises a rear edge 2 and a front edge 3. The rear edge and the front edges are connected by side edges 4, which flare out forwardly to form wings, 5. Parallel to rear edge 2 are one or more scored lines 6. The sheet 1 may also comprise one or more die cuts 7, which can be folded in order to form back stop tabs. Sheet 1 also comprises a locking mechanism 10 comprising a scored line 11, which is substantially parallel to scored line 6, die cuts 12a and 12b, which intersect scored line 6, and die cut 13, which is parallel to scored line 6 and scored line 11. The locking mechanism 10 can be folded downwardly in order to form a die cut finger 20, such that die cut edge 13 forms the tip of the finger 20. The locking mechanism 20 is designed in such a manner that the portion of the platform lying between rear edge 2 and die cut edge 13, and adjacent to edge 13, has been removed, thereby forming slot 14, when the leg is folded.

Figure 1B:
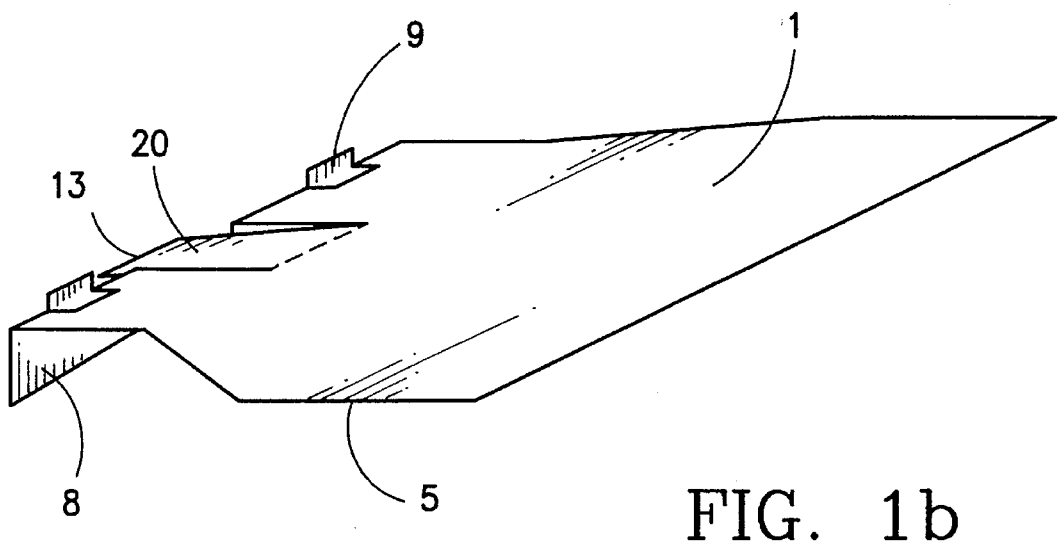
FIG. 1b shows a side view of the levelling device of FIG. 1a which has been assembled and is ready to use.

FIG. 1b shows the levelling device in assembled form and illustrates the ease and simplicity of the present invention. To assemble the sheet shown in FIG. 1a into the platform device, that portion of sheet 1 located between rear edge 2 and the scored line 6 is folded along said scored line in a downward direction, thereby forming leg 8, said leg providing a support for the horizontal surface of the platform. The die cut finger 20 then is pressed into the slot created when the leg 8 is formed and is retained in the slot by friction. In this manner, the leg 8 is retained in a position such as to support the platform. The two side wings 5 are designed to span the raised thigh supports commonly found in most vehicle seats, particularly bucket seats. These side wings 5 may be simply created by devising sheet 1 in such a manner that the width of front edge 3 is longer than that of rear edge 2. The height of the leg can be adjusted by folding it further under the platform. For this purpose, a number of scored lines 6 may be incorporated in the platform, parallel to each other, such that the user can choose to fold the support leg along the scored line which provides the correct height for the user's car seat. As noted above, the tip of die cut finger 20 is formed by die cut edge 13, as shown in FIG. 1 a. In order to provide a tighter friction fit within slot 14, the length of die cut edge 13 may be slightly larger than the die cut edge 15, which forms the opposite end of slot 14. Preferably, die cut edge 13 is 1/16" wider than die cut edge 15 in order to provide a tight friction fit. However, the width of the edge 13 and the width of the finger can be adjusted as will be apparent to those skilled in the art. Moreover the die cuts, 12a and 12b do not have to be parallel; rather, the die cuts may be either convergent or divergent. Die cuts 7, parallel to the scored line 6 of FIG. 1a, are folded upward from the horizontal surface of the platform to provide one or more back-stop tabs 9. These back stop tabs 9 provide additional support for the container which is placed on the platform. For example, the back-stop tab holds the food container away from the back rest of the car seat and is particularly useful in those situations where the foodstuff in the container could penetrate the container and soil the backrest and car seat.

Figure 2:
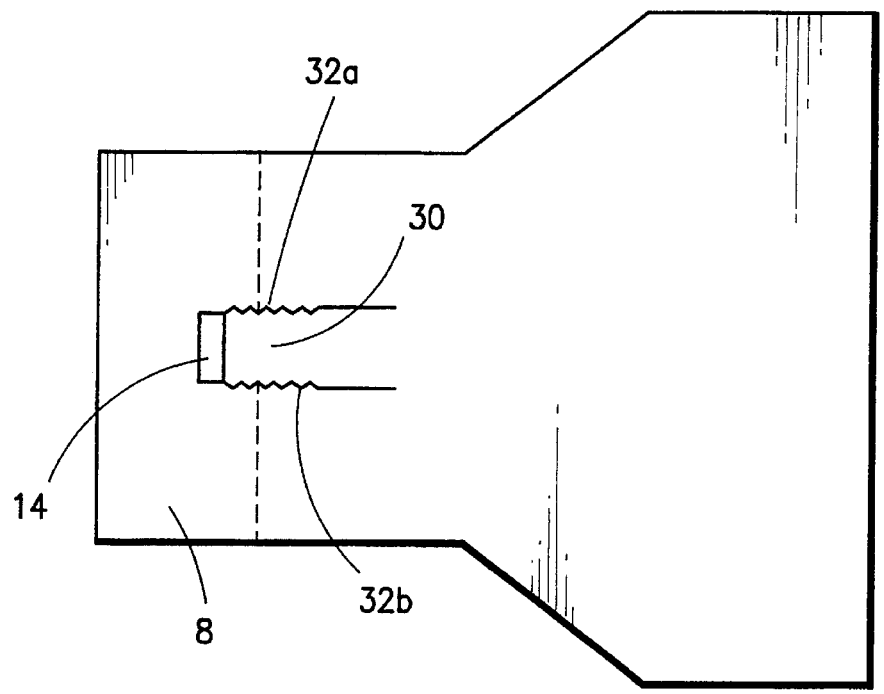
FIG. 2 shows a top view of the levelling device of the present invention in its unassembled form which contains serrations or teeth on both sides of the finger.

A variation of the platform shown in FIG. 1a is illustrated in FIG. 2 wherein the die cut forming the finger 30 is formed with serrated or toothed edges 32a and 32b. In this manner, the "teeth" engage the slot 14 in order to provide additional means to retain leg 8 in a position to support the platform. Although both edges of the die cut are shown as serrated, it is to be understood that only one edge may be serrated. The serrations or teeth may be either regularly disposed along edges 32a and 32b as shown in FIG. 2, or may be irregularly disposed, as will be apparent to those skilled in the art.

Figure 3:
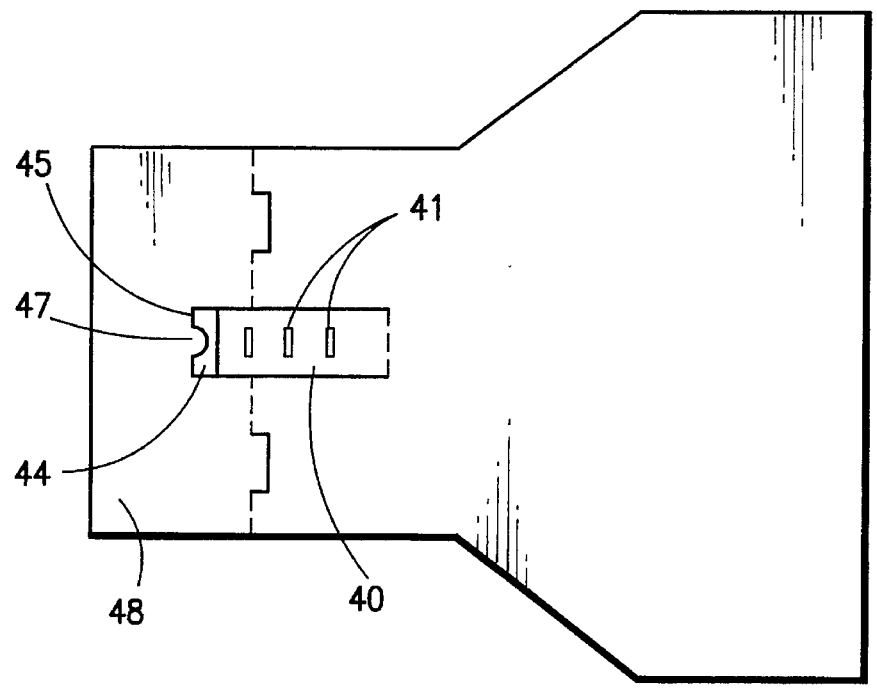
FIG. 3 shows another embodiment of the levelling device of the present invention in unassembled form.

A second variation of the platform shown in FIG. 1 is illustrated in FIG. 3. The die cut finger 40 shown in this embodiment comprises one or more die cut slots 41, situated along the length of the finger and which are in a parallel relationship when more than one die cut slot is present. Additionally, edge 45 of slot 44 is notched in order to form a protrusion or retainer tab 47. In this manner, once the leg 48 is folded downward, the retainer tab 47 can be inserted into one of the slots 41 in order to maintain the leg 48 in a supporting position. Accordingly, the user can manipulate these die cut slots 41 in order to position the platform for high, medium or low settings, depending upon the configuration of the automobile seat. As will be apparent to those skilled in the art, the number of die cut slots 41 can be varied.

Figure 4A:
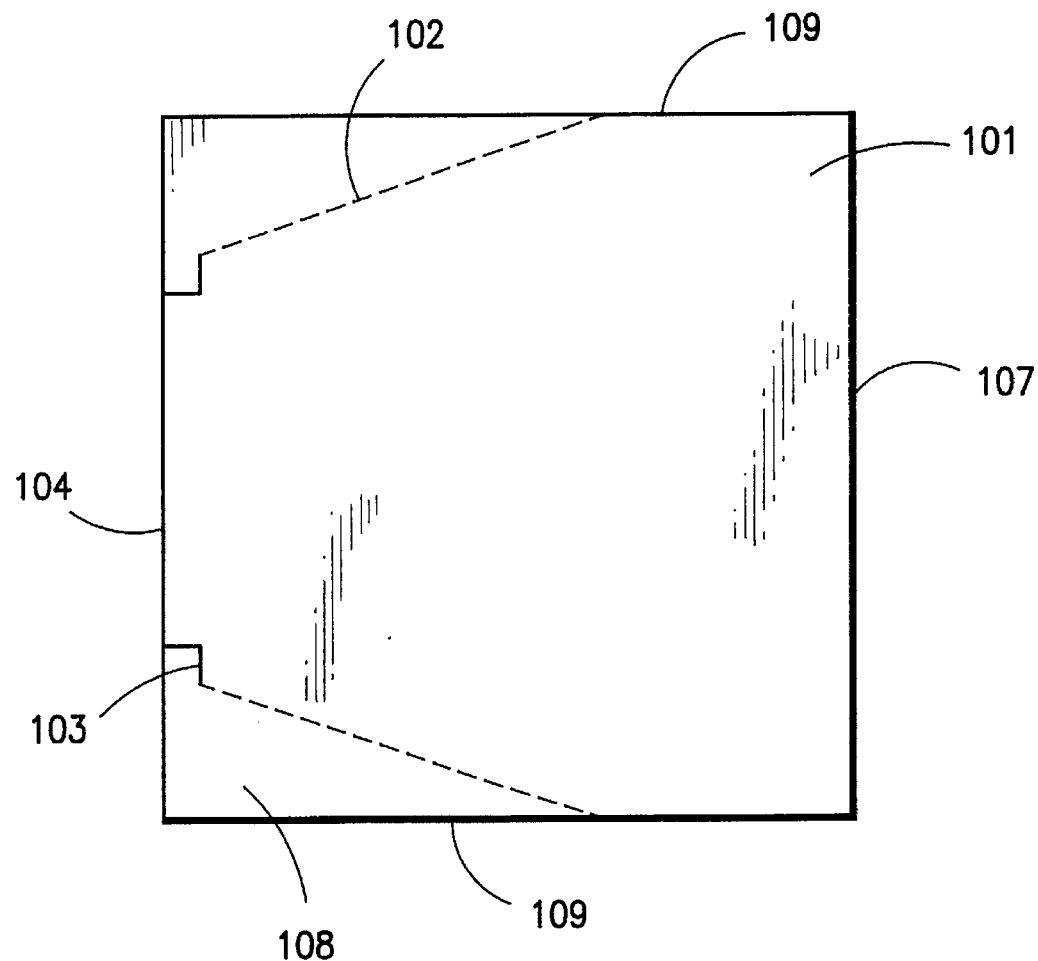
FIG. 4a shows another embodiment of the levelling device of the present invention in it unassembled form.
Figure 4B:
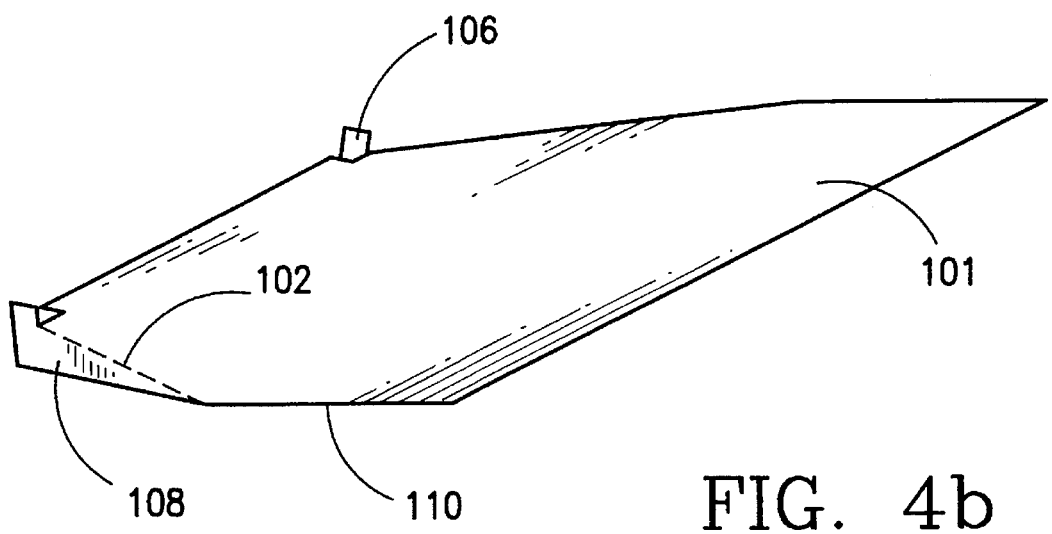
FIG. 4b shows a side view of the levelling device of FIG. 4a which is assemble and ready to use.

FIGS. 4a and 4b illustrate another embodiment of the present invention, whereby the platform 101 comprises a rear straight edge 104, a front straight edge 107, side edges 109, and two scored lines 102, formed diagonally between side edges 109 and near the rear edge 104. The scored lines 102 are contiguous with die cuts 103, said die cuts 103 being L-shaped and intersecting both rear straight edge 104 and the scored lines 102. The portions of the sheet bounded by rear straight edge 104, scored lines 102 and side edges 109 are folded downward in order to form two support legs 108, as shown in FIG. 4b. In forming the legs 108, two wings 110 are formed from the resulting side edges 109. The die cuts 103 are folded upwardly in relation to the horizontal surface of the sheet, thereby creating retainer tabs 106 which retain legs 108 in a substantially vertical position.

Figure 5A:
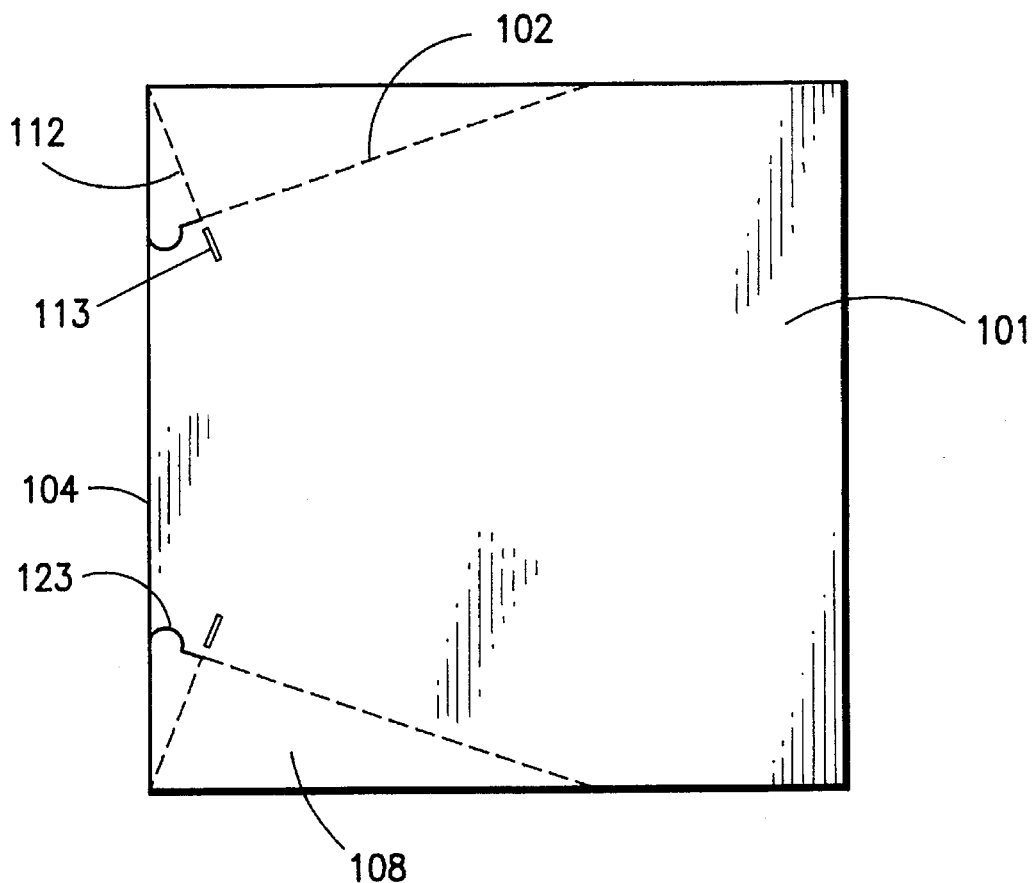
FIG. 5a shows another embodiment of the levelling device of the present invention in it unassembled form.
Figure 5B:
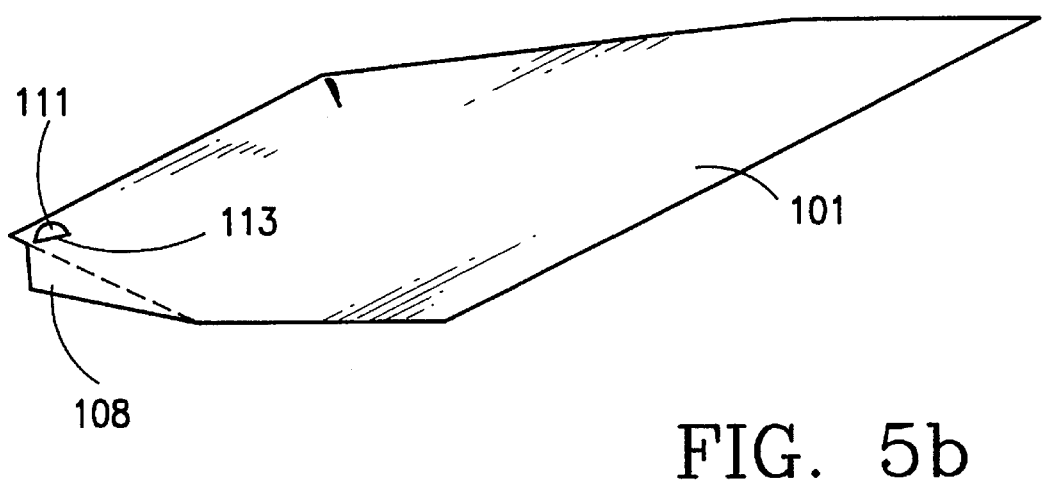
FIG. 5b shows the embodiment of FIG. 5a in its assembled form.

FIGS. 5a and 5b illustrate a variation of the embodiment shown in FIG. 4a. Referring to FIG. 5a, the sheet 101 comprises two additional scored lines 112 disposed between the corners of rear edge 104 and scored diagonally to the point where they intersect scored lines 102, as shown in FIG. 5a. In addition, two die cuts 113 are disposed in the linear directions of scored lines 112, slightly forward the intersection with scored lines 102. In this manner, the two die cuts 123 located adjacent to the rear edge 104, are folded upward to form retainer tabs 111, as shown in FIG. 5b. The retainer tabs 111 are inserted through the die cuts 113 to retain the legs 108 in position, as shown in FIG. 5b. The retainer tabs also act as back stop tabs, thereby keeping the container from sliding off the platform.

Figure 6A:
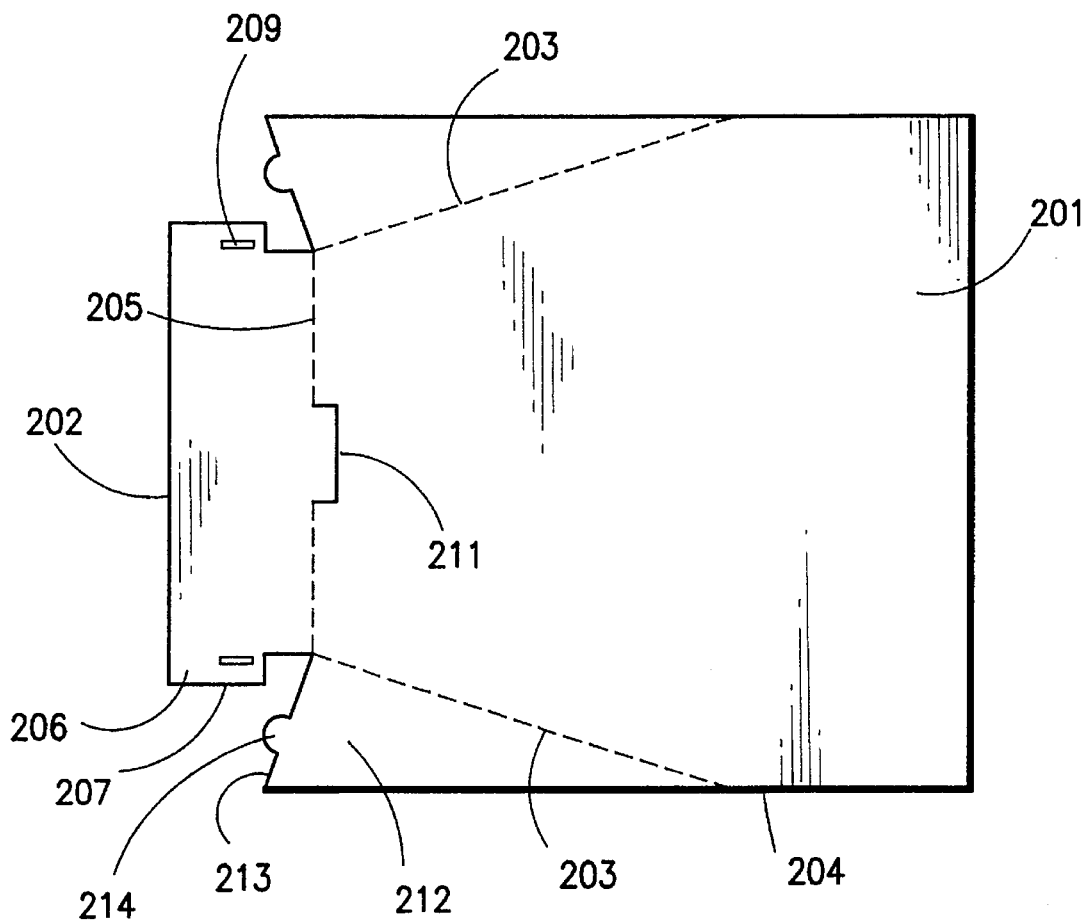
FIG. 6a shows another embodiment of the levelling device of the present invention in its unassembled form.
Figure 6B:
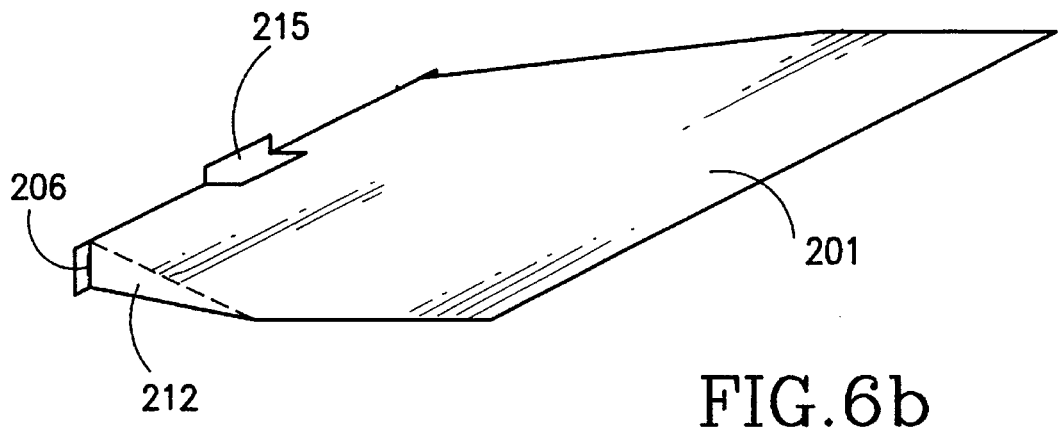
FIG. 6b shows the embodiment of FIG. 6a in its assembled form.

FIGS. 6a and 6b illustrate another embodiment of the present invention. Referring to FIG. 6a the platform sheet 201 comprises a rear straight edge 202 which is parallel to a scored line 205. Two additional scored lines 203 are disposed between either end of scored line 205 and one of the side edges 204, as shown in FIG. 6a. Scored line 205 is interrupted in the center thereof by a die cut 211, which is shown as a C-shaped die cut. The portion of sheet lying between rear edge 202 and scored line 205 is folded downward to form leg 206. Leg 206 is bounded by rear edge 202, leg side edges 207, scored line 205 and die cut 211. Parallel to and near leg side edges 207 are slots 209. To assemble the support leg 206, scored line 205 and die cut 211 are folded downward, thereby forming back stop tab support 215 as shown in FIG. 6b. The portions of the sheet bounded by scored lines 203 and edges 204 are folded downward to form legs 212. The edges 213 of the legs 212 are fashioned with projections which form retainer tabs 214 for insertion through the slots 209 on leg 206 in order to retain the legs 212 in proper position.

Figure 7A:
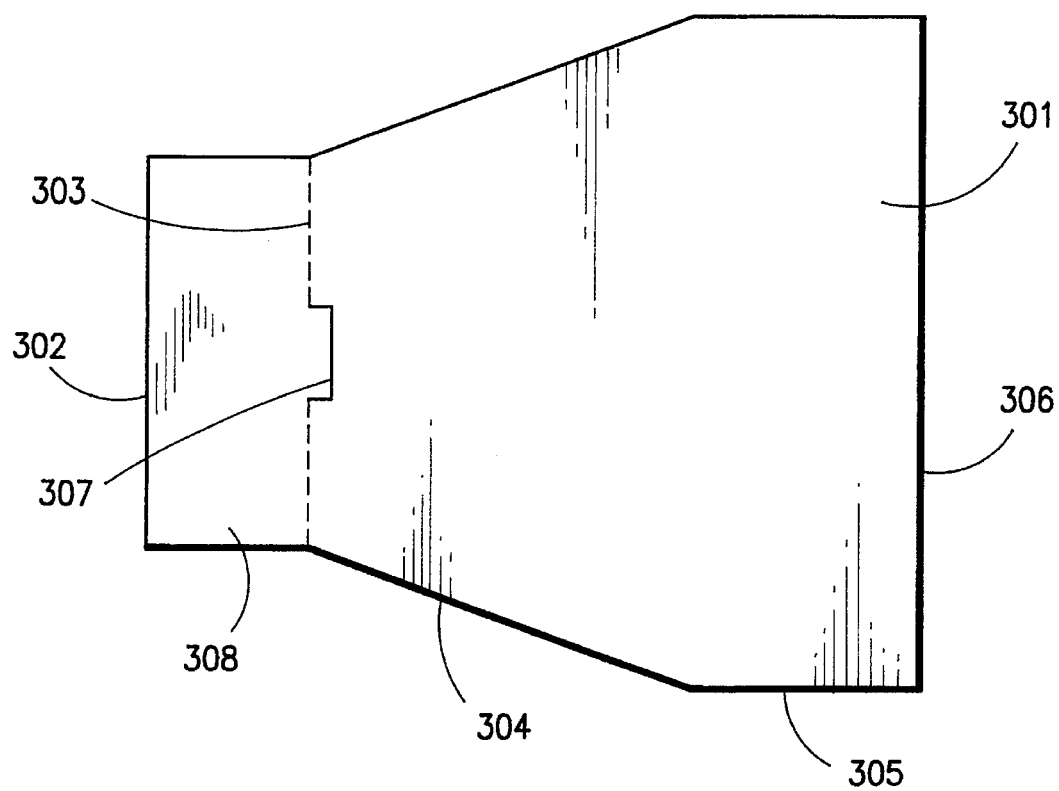
FIG. 7a shows another embodiment of the levelling device of the present invention in its unassembled form.
Figure 7B:
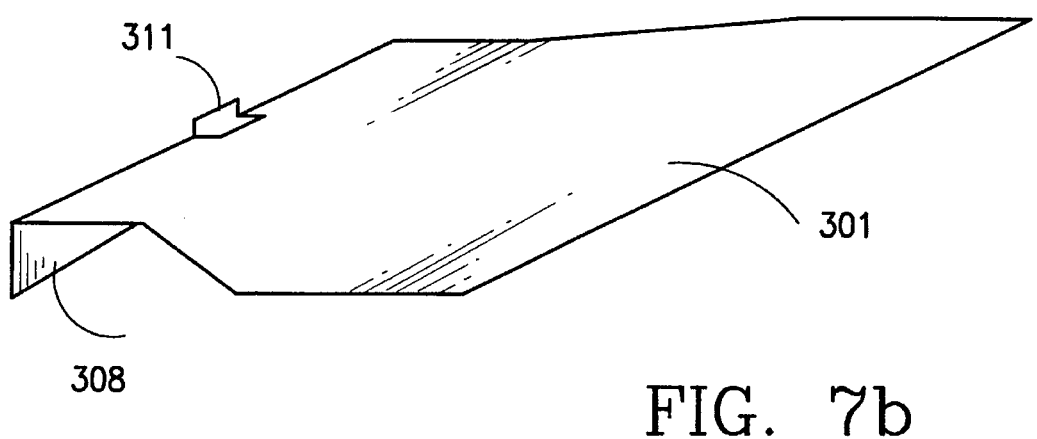
FIG. 7b shows the embodiment of FIG. 7a in its assembled form.

FIG. 7a and 7b illustrate another embodiment of the present invention. Referring to FIG. 7a, the platform sheet 301 comprises a straight rear edge 302 parallel to scored line 303, side edges 304 and front edge 306. A back stop tab 307 is die cut parallel to scored line 303, on the side opposite rear straight edge 302. Side edges 304 flare out forwardly to form wings 305 for better adjustment with bucket seats. The portion of the sheet between rear straight edge 302 and a scored line 303 of FIG. 7a is folded down to form leg 308, as shown in FIG. 7b. The leg 308 simply folds downward against the seat back and the user relies upon friction between the platform and the car seat to hold the device in place. In this manner, leg 308 will remain substantially vertical against the back of the car seat. Die cut 307 of FIG. 7a folds upward to form back stop tab 311.

Figure 8A:
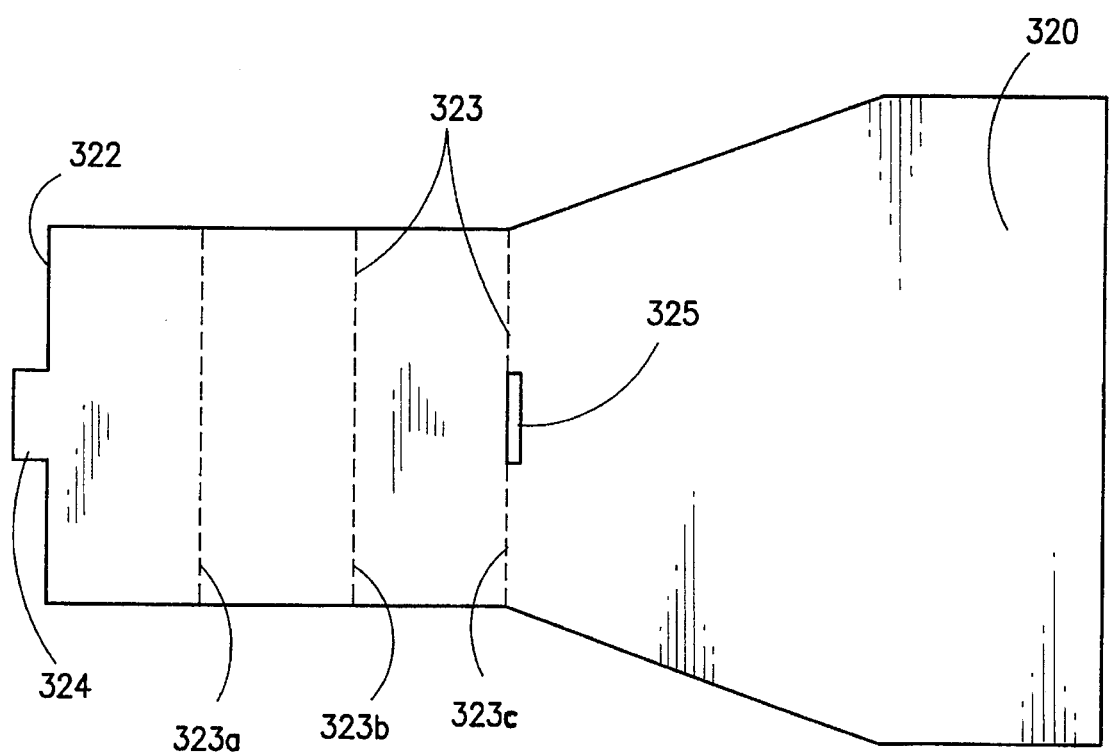
FIG. 8a shows another embodiment of the levelling device of the present invention in its unassembled form.
Figure 8B:
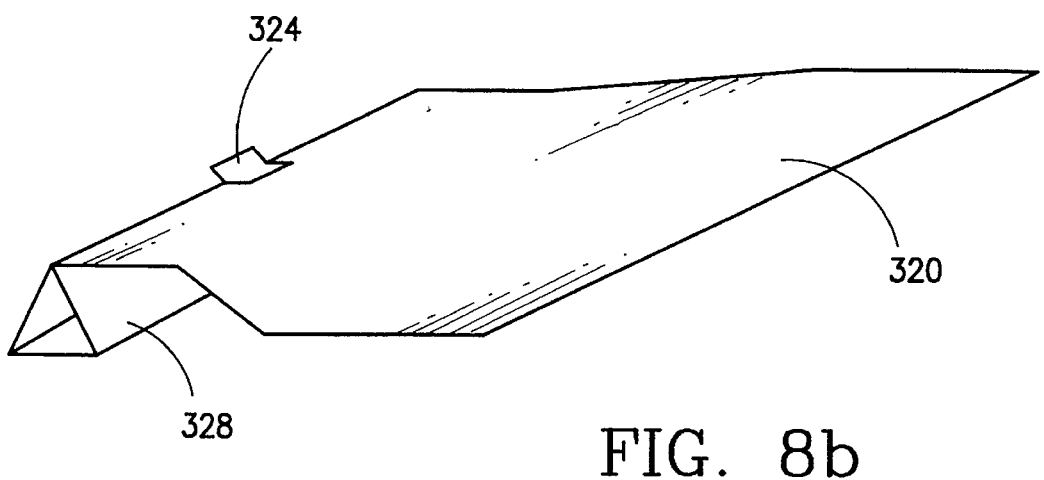
FIG. 8b shows the embodiment of FIG. 8a in assembled form.

FIGS. 8a and 8b illustrate a variation of the platform device shown in FIG. 7a. The platform sheet 320 comprises rear edge 322 parallel to at least two scored lines 323. Although three scored lines 323a, 323b and 323c are shown, it is to be understood that additional scored lines 323 may be provided. The rear edge 322 is provided with a tongue or similar protrusion 324 which may be centered along the rear edge. A die cut slot 325 is provided along the scored line farthest from said rear edge 322, in this instance, scored line 323c. To assemble the platform device 320, the portions of the sheet between the rear edge 322 and the nearest scored line 323a and between the remaining scored lines, are folded to form a prism-shaped leg 328. Tongue 324 is inserted into the slot 325 in order to anchor the folded leg into position and also functions as a back stop.

While particular embodiments of the invention have been described, it will be understood, of course, that the invention is not limited thereto, and that many obvious modifications and variations can be made, and that such modifications and variations are intended to fell within the scope of the appended claims.

What is claimed is:

1. A levelling device for converting an automobile seat into a flat horizontal surface, consisting of a single sheet of foldable material consisting of:

(a) a straight rear edge;

(b) a straight from edge;

(c) two side edges, each of said side edges being configured in the form of a stretched "Z";

(d) a primary scored line located parallel to said rear edge and extending from one of said side edges to the other of said side edges, such that said scored line can be folded downward to form a support leg;

(e) at least one die cut contiguous to said primary scored line, such that said die cut is folded upward to form a back stop tab; and (f) a locking mechanism in the form of a die cut finger comprising a secondary scored line located parallel to said rear edge and further from said rear edge than said primary scored line, a primary die cut which is parallel to said rear edge and between said rear edge and said primary scored line, two secondary die cuts perpendicular to said secondary scored line and extending from said secondary scored line to said primary die cut, said locking mechanism being formed by pressing downwardly to form a die cut finger, wherein said finger is used to keep said support leg in a secure position.

2. A levelling device in accordance with claim 1, wherein said die cut finger has a proximal end and a distal end, said distal end disposed distal to said secondary scored line, wherein the tip of the distal end of said die cut finger has been removed to form a slot in said foldable material.

3. A levelling device in accordance with claim 2, wherein said slot comprises four edges, and wherein at least one of the four edges of said slot comprises at least one protrusion.

4. A levelling device in accordance with claim 3, wherein said finger comprises at least one slot, said finger being immobilized by inserting said protrusion in said finger slot.

5. A levelling device in accordance with claim 1, comprising two die cuts, each of said die cuts being contiguous to said primary scored line, such that each of said die cuts can be folded upward to form a back stop tab.

6. A levelling device in accordance with claim 1, wherein said foldable material is cardboard.

7. A levelling device for converting an automobile seat into a flat horizontal surface, comprising a sheet of foldable material having:

a) at least one straight edge;

b) at least one primary scored line located parallel to said straight edge, such that said scored line can be folded downward to form a support leg;

c) a locking mechanism comprising a secondary scored line, two parallel die cuts each intersecting the said primary scored line and a third die cut which is parallel to said secondary scored line, said locking mechanism being pressed downward to form a die cut finger, wherein said finger is used to keep said support leg in a secure position;

d) a slot formed by the removal of said foldable material between said straight edge and said finger, and adjacent to said finger, said slot comprising four edges, and wherein at least one of said four edges of said slot comprises at least one protrusion; and e) at least one finger slot disposed within said finger, such that said finger is immobilized by inserting said protrusion in said finger slot.

8. A levelling device for converting an automobile seat into a flat horizontal surface, comprising a sheet of foldable materials having:

(a) at least one straight rear edge;

(b) at least one straight front edge;

(c) at least one primary scored line located parallel to said straight rear edge, such that said scored line can be folded downward to form a support leg;

(d) a locking mechanism in the form of a die cut finger comprising a secondary scored line located parallel to said rear edge and further from said rear edge than said primary scored line, a primary die cut which is parallel to said rear edge and between said rear edge and said primary scored line, two secondary die cuts perpendicular to said secondary scored line and extending from said secondary scored line to said primary die cut, said locking mechanism being formed by pressing downwardly to form a die cut finger, wherein said finger is used to keep said support leg in a secure position.

(e) a finger slot formed by the removal of the foldable material located between said straight edge and said finger and adjacent to said finger, said slot having four edges, at least one of said edges having at least one protrusion such that said finger is immobilized by inserting said protrusion into one of a plurality of die cut slots disposed within said finger.

* * * * *